(12) United States Patent
Velez

(10) Patent No.: US 9,545,817 B2
(45) Date of Patent: Jan. 17, 2017

(54) NON FRICTIONAL WHEEL ENHANCING ASSEMBLY

(71) Applicant: Andres Velez, Valencia, CA (US)

(72) Inventor: Andres Velez, Valencia, CA (US)

( * ) Notice: Subject to any disclaimer, the term of this patent is extended or adjusted under 35 U.S.C. 154(b) by 743 days.

(21) Appl. No.: 13/778,217

(22) Filed: Feb. 27, 2013

(65) Prior Publication Data

US 2014/0239701 A1 Aug. 28, 2014

(51) Int. Cl.
   *B60B 7/20* (2006.01)
   *B60B 7/06* (2006.01)
   B60B 7/00 (2006.01)

(52) U.S. Cl.
   CPC ............ *B60B 7/20* (2013.01); *B60B 7/066* (2013.01); *B60B 7/0033* (2013.01); *B60B 2900/572* (2013.01)

(58) Field of Classification Search
   CPC ............ B60B 7/00; B60B 7/06; B60B 7/065; B60B 7/20; B60B 2900/572
   See application file for complete search history.

(56) References Cited

U.S. PATENT DOCUMENTS

| | | | |
|---|---|---|---|
| 4,280,293 A | 7/1981 | Kovalenko et al. | |
| 5,016,944 A * | 5/1991 | Schultz | B60B 7/20 301/108.1 |
| 5,190,354 A * | 3/1993 | Levy | B60B 7/20 301/37.25 |
| 5,813,938 A | 9/1998 | Forster | |
| 5,957,542 A * | 9/1999 | Boothe | B60B 7/20 301/108.4 |
| 6,164,678 A | 12/2000 | Fryer | |
| 6,517,167 B2 | 2/2003 | Baker | |
| 6,536,848 B1 | 3/2003 | Goodman | |
| 6,848,751 B1 | 2/2005 | Yuan | |
| 6,857,709 B1 | 2/2005 | McLean et al. | |
| 7,472,967 B2 | 1/2009 | DoVale, Jr. et al. | |
| 7,503,630 B2 | 3/2009 | Chester, Jr. | |
| 2008/0106140 A1* | 5/2008 | Velez | B60B 7/20 301/37.102 |
| 2013/0076106 A1* | 3/2013 | Mooney | B60B 7/20 301/37.25 |

\* cited by examiner

*Primary Examiner* — Frank Vanaman
(74) *Attorney, Agent, or Firm* — James Ray & Assoc.

(57) ABSTRACT

A non frictional wheel enhancing assembly that utilizes bolts and lubricated joints to attach to a wheel, remains level and independent of the wheel as the wheel revolves, inhibits friction and heat between the wheel and a wheel cover, and aesthetically enhances the wheel without covering the perimeter of the wheel. The wheel assembly includes an attachment surface with three extending bolts that press outwardly, against an inner circumference of a wheel hub to create pressure and grip for attaching the wheel cover with the wheel. The wheel cover also secures to the wheel through numerous lubricated joints, adapters, and fasteners. The lubricated joints facilitate revolution of the wheel cover to minimize friction between the wheel and the wheel cover, and improve fuel efficiency for the vehicle. The wheel cover displays decorative indicia. A counterweight allows the wheel cover to remain level and revolve independently of the wheel.

16 Claims, 8 Drawing Sheets

NON FRICTIONAL WHEEL ENHANCING ASSEMBLY

FIELD OF THE INVENTION

The present invention relates generally to a wheel accessory. More specifically, the present invention provides a wheel accessory that works in conjunction with a wheel and wheel hub to inhibit friction with a wheel, and decoratively enhance the wheel for identification of a vehicle, aesthetics, or commercial embodiments.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that the rim is the outer edge of a wheel, holding the tire. It makes up the outer circular design of the wheel on which the inside edge of the tire is mounted on vehicles such as automobiles. For example, on a bicycle wheel the rim is a large hoop attached to the outer ends of the spokes of the wheel that holds the tire and tube.

Typically, wheels, rims, hubcaps, and center caps of various types provide protection to vehicle wheels and adornment for a tire. Manufacturers provide wheel rims and center caps that enhance the style of a vehicle and may advertise the brand of car. Car owners may have a desire to publicize their own interests, advertise products, promote stores, show off their affiliation with a sports or religious organization, and otherwise make a statement.

Typically, a hubcap, wheel cover or wheel trim is a decorative disk on an automobile wheel that covers at least a central portion of the wheel. Vehicles with stamped steel wheels often use a full wheel cover that conceals the entire wheel. Vehicles with alloy wheels or styled steel wheels generally use smaller hubcaps, sometimes called center caps.

Even though the above cited wheel accessories address some of the needs of the market, a wheel accessory that works in conjunction with a wheel and rim to provide an aesthetic and functional effect is still desired.

SUMMARY OF THE INVENTION

This invention is directed to a non frictional wheel enhancing assembly that utilizes perpendicularly extending support members and lubricated joints to attach to a wheel, remains level and independent of the wheel as the wheel revolves, inhibits friction and heat between the wheel and a wheel cover, and aesthetically enhances the wheel without covering the perimeter of the wheel. The wheel assembly includes a wheel cover with two independently operable surfaces. An attachment surface includes a multiplicity of perpendicularly extending support members that press outwardly, against an inner circumference of a wheel hub to create pressure and grip for attaching the wheel cover with the wheel. The wheel cover also secures to the wheel through numerous lubricated joints, adapters, and fasteners. A revolving surface of the wheel cover allows the wheel cover to maintain the freedom to revolve freely and independently of the wheel. A lubricated joining member facilitates revolution of the revolving surface to minimize friction between the wheel and the wheel cover, and improve fuel efficiency for the vehicle. A counterweight allows the wheel cover to remain level and revolve independently of the wheel. The wheel cover displays decorative indicia. The non frictional wheel enhancing assembly works in conjunction with the wheel and a wheel hub to enhance the outer surface of the wheel. The wheel enhancements provide functional as well as aesthetic uses, and may include, without limitation, identification of a vehicle, decorations for the wheel, and commercial embodiments.

In some embodiments, the non frictional wheel enhancing assembly includes a wheel cover that secures to the wheel through a multiplicity of support members, lubricated joining members, bearing members, universal adapters, and fasteners. An attachment surface of the wheel cover may include the support members that engage within an inner circumference wheel hub. The support members may include three perpendicularly extending bolts that press outwardly, against an inner circumference of the wheel hub to create pressure and grip for attaching the wheel cover with the wheel. A revolving surface of the wheel cover maintains the freedom to revolve freely and independently of the wheel. In one embodiment, the attachment surface and the revolving surface are configured separately, whereby each portion may operate independently of the other. The support members allow the wheel cover to attach to the wheel without utilizing extra components and tools. The revolving surface of the wheel cover may also revolve freely and independently on the wheel hub by minimizing contact with the perimeter of the wheel, and utilizing bearing members located inside of the lubricated joining member. The bearing members including grease, spherical bearings, and bushings. The lubricated joining members facilitate rotation of the wheel cover in conjunction with a coaxial wheel hub to minimize frictional forces between the wheel and the wheel cover. The resultant free and independent movement of the wheel cover allows for a reduction in frictional heat between the wheel cover and the wheel hub, and an increase in fuel efficiency for the vehicle. The wheel cover displays indicia such as decorative text and graphics for identification of a vehicle, aesthetics for the wheel, company logos, advertisement, and promotions. The wheel cover remains level and non-rotational, even while the wheel is revolving partially because of a stabilizing member that attaches to the inner surface of the wheel cover. The stabilizing member prevents rotation of the wheel cover with respect to the rotating wheel during vehicle movement by serving as an equivalent counterbalancing weight that balances the wheel cover weight.

A first aspect of the present invention provides a cover assembly for a rotating wheel. The cover assembly includes a first member configured for attachment to a hub of the rotating wheel for rotation therewith, and a second member mounted on the first member and having a weighted portion thereof configured to substantially inhibit rotation of the second member during rotation of the first member.

In a second aspect, the multiplicity of support members includes three extending bolts that press outwardly, against an inner circumference of a wheel hub to create pressure and grip for attaching the wheel cover with the wheel.

In another aspect, the wheel enhancing assembly allows a decorative wheel cover to freely move independently of the wheel and remain level, even while the wheel revolves. A revolving surface of the wheel cover revolves independently of the wheel. A stabilizing member attached to the wheel enhancing assembly prevents rotation of the wheel cover with respect to the revolving wheel during vehicle movement by serving as an equivalent counterbalancing weight that balances the weight of the wheel cover.

In another aspect, the lubricated joining member facilitates installation and movement of the wheel cover in conjunction with a coaxial wheel hub to minimize frictional forces between the wheel and the wheel cover. The lubricated joining member inhibits frictional forces between the wheel hub and the wheel cover to inhibit friction and heat, and improve fuel efficiency for the vehicle. The lubricated joining member joins the wheel hub and the wheel enhancing assembly. The lubricated joining member revolves around at least one bearing member that positions inside the lubricated joining member for facilitating rotary applications. Each bearing member includes numerous components for inhibiting friction and heat, including, without limitation, a predetermined quantity of grease, at least one spherical bearing, and at least one bushing. Each bushing may include at least two races to contain each spherical bearing and transmit a radial load and an axial load through each spherical bearing. The races provide a non frictional surface for each spherical bearing for rotary applications. The predetermined quantity of grease may also be utilized inside the bushing to further enhance the non frictional effect by lubricating the space between each spherical bearing and absorbing heat generated by the rotation of the lubricated joining member. The enhanced lubrication created by the lubricated joining member may also inhibit stress on the wheel from the additional weight of the wheel enhancing assembly. In this manner, frictional forces and heat may be minimized inside the lubricated joining member and fuel efficiency for the vehicle improves. Those skilled in the art, in light of the present teachings, will recognize that a multiplicity of bearings and bushings may be utilized to inhibit friction and heat in the lubricated joining member, including, without limitation, sleeved bushings, flanged bushings, split bushings, ball bearings, sliding bearings, and the like.

In another aspect, the wheel enhancing assembly provides an aesthetically enhanced wheel cover for a wheel without covering the outer perimeter of the wheel. The wheel remains level and stationary during revolution of the wheel.

One objective of the present invention is to secure the wheel cover to the wheel without utilizing extra components and tools.

Another objective of the present invention is to improve fuel efficiency for the vehicle by minimizing friction between the wheel and the wheel cover.

Another objective of the present invention is to provide a simple, non-obtrusive device that allows a person to customize his/her vehicle to express personal affiliations, artistic creations, commercial advertising and general speech.

A further objective of the present invention is to minimize friction and heat between the wheel cover and the wheel through the use of bearings, bushings, and grease.

Another objective of the present invention is to provide interchangeable wheel covers and indicia for an eclectic permutation of designs.

Yet another objective of the present invention is a simple mechanical structure that provides off-the-shelf components and fast interchangeability of wheel covers and indicia.

Yet another objective of the present invention is to provide inexpensive commercial embodiments such as advertising and marketing means.

Yet another objective of the present invention is to provide a custom tailored look to a vehicle for a variety of uses.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

DETAILED DESCRIPTION OF THE INVENTION

Figure 1:
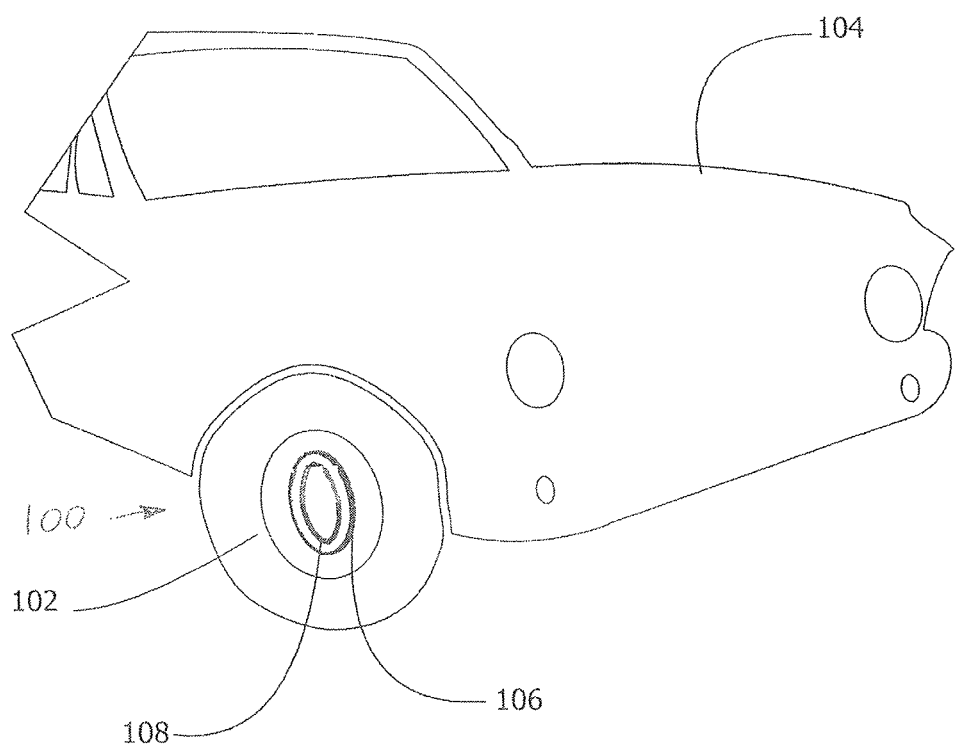
FIG. 1 illustrates a partial perspective view of a vehicle with a wheel enhancing assembly joined with a wheel, in accordance with at least one embodiment of the present invention.

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

FIGS. 1 through 8 illustrate exemplary embodiments and various views of a wheel trim or wheel enhancing assembly 100, in accordance with at least one embodiment of the present invention. In some embodiments, the wheel enhancing assembly 100 works in conjunction with a wheel 102 on a vehicle 104 to provide protection and adornment for the wheel 102. The wheel enhancing assembly 100 attaches securely to the wheel 102, more particularly to the hub 103, either within an aperture 103a thereof or to an exterior surface thereof, maintains the freedom of its cover member 106 to revolve independently from the rotating wheel 102, and remains generally level and generally stationary while the wheel 102 is revolving. It is to be understood that the cover 106 is substantially inhibited from rotation during rotation of the wheel 102. Term substantial is to be taken herein as allowing insignificant rotational movement of the cover 106 that does not affect generally level and generally stationary appearance of the wheel cover 106 during rotation of the wheel 102. The wheel cover may also provide the external visual portion of the wheel enhancing assembly 100. In one embodiment an attachment surface 122 of the wheel enhancing assembly 100 engages a surface of the wheel hub 103 for providing a secure attachment between the wheel cover 106 and the wheel 102 with fasteners 120. A revolving surface 124 of the wheel cover 106 moves freely and independently on the wheel 102 by operating separately from the attachment surface 122, minimizing contact with the perimeter of the wheel 102, and revolving around a joining member 116, which is preferably lubricated. A multiplicity of threaded support members 120 extend from the attachment surface 122 of the wheel enhancing assembly 100 so that the thickness of the hub 103 can be caged between the surface 122 and head portions of the threaded support members 120, such as conventional threaded bolt or screw. Due to the free movement of the wheel cover 106 and lubricating components, friction and heat between the wheel 102 and the wheel cover 106 are inhibited.

In some embodiments, the wheel cover 106 attaches securely to the wheel 102, while still revolving free and independently of the wheel 102. An attachment surface 122 of the wheel cover 106 may include components for engaging the wheel 102 and the wheel hub 103. A revolving surface 124 of the assembly 100 maintains the freedom to revolve freely and independently of the wheel 102. In one embodiment, the attachment surface 122 and the revolving surface 124 are configured separately, whereby each portion may operate independently of the other. In one alternative embodiment, the attachment surface 122 and the exterior surface 124 may join together at a medial wheel cover hub. In some embodiments, the medial wheel cover hub may include an outer perimeter with bushings and bearings that is operable to allow the exterior surface 124 to revolve freely. The medial wheel cover hub may also include an outer perimeter with ridges and fasteners for securing the attachment surface 122 into a fixed position. However, in an alternative embodiment, the exterior surface 124 may include, without limitation, a fixed portion for securing to the attachment surface 122, and a revolving portion for revolving.

In some embodiments, the wheel cover 106 may include the multiplicity of support members 120 that extend substantially perpendicular from the attachment surface 122 of the wheel cover 106 for engaging the wheel hub 103. The multiplicity of support members 120 may flare slightly away from the attachment surface 122 to create pressure and grip against the inner circumference of the wheel hub 103, with further use of nut fasteners. Each support member 120 presses outwardly against the inner circumference of the wheel hub 103. The outward pressure created by the multiplicity of support members 120 may create a resistive force that creates pressure and grip between the wheel cover 106 and the wheel 102. In one embodiment the multiplicity of support members 120 include three hexagonal bolts that extend perpendicularly from the attachment surface 122 of the wheel cover 106. However, in other embodiments, any number of support members 120 efficacious for providing grip and pressure against the wheel hub 103 may be utilized. In one embodiment, threads or ridges on the bolts may further enhance the grip between the bolts and the inner circumference of the aperture 103a of the wheel hub 103. Once the multiplicity of support members 120 is fully inserted and in coaxial alignment within the wheel hub 103, the wheel cover 106 is securely attached to the wheel 102. However, the revolving surface 124 of the wheel cover 106 may still revolve freely and independently from the wheel 102 so that it is essentially inhibited from rotation during rotation of the wheel 102.

Figure 4:
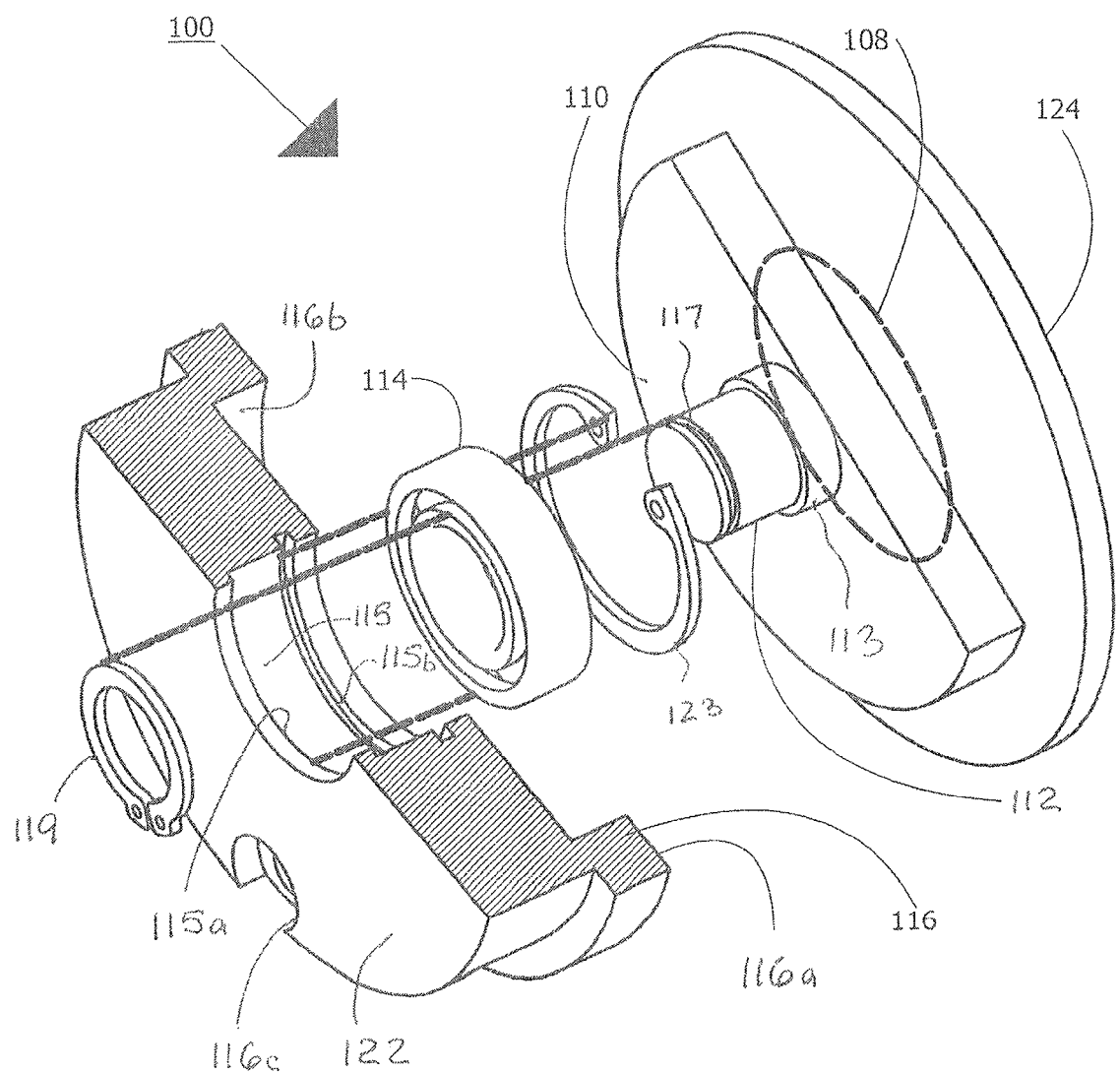
FIG. 4 illustrates an exploded view of the wheel enhancing assembly, in accordance with at least one embodiment of the present invention.

In some embodiments, for example as illustrated in FIG. 4, the lubricated joining member 116 facilitates installation and movement of the revolving surface 124 in conjunction with the coaxial wheel hub 103 to minimize frictional forces between the wheel 102 and the wheel cover 106. The joining member 116 inhibits friction and heat between the wheel hub 103 and the revolving surface 124, and improves fuel efficiency for the vehicle 104. The joining member 116 revolves around at least one bearing member 114 positioned inside the joining member 116 for facilitating rotary applications. Each bearing member 114 may be a roller or a ball type bearing or a tubular bushing. Each bearing member 114 may include at least two races to contain each spherical bearing and transmit a radial load and an axial load through each spherical bearing. The races provide a non frictional surface for each spherical bearing for rotary applications. The predetermined quantity of grease may also be utilized inside the bushing to further enhance the non frictional effect by lubricating the space between each spherical bearing and absorbing heat generated by the rotation of the joining member 116. The enhanced lubrication created by the joining member 116 may also inhibit stress on the wheel 102 from the additional weight of the wheel enhancing assembly 100. In this manner, friction and heat may be minimized inside the joining member 116 and fuel efficiency for the vehicle 104 improves. Those skilled in the art, in light of the present teachings, will recognize that a multiplicity of bearings and bushings may be utilized to inhibit friction and heat in the joining member 116, including, without limitation, sleeved bushings, flanged bushings, split bushings, ball bearings, sliding bearings, and the like. In some embodiments, the wheel cover 106 may not engage the perimeter of the wheel 102 resulting in free movement of the revolving surface 124, which allows for a reduction in friction and heat between the components of the wheel 102 and the wheel cover 106, and an increase in fuel efficiency for the vehicle 104.

In some embodiments, the wheel cover 106 may display decorative indicia 108 on the outer surface of the wheel 102 for an eclectic variety of uses including, without limitation, advertising, style, decoration, promotions, and the like. Both the wheel cover 106 and the indicia 108 that overlays the wheel cover 106 may be interchangeable for customizing the wheel 102 to a desired look. For example, without limitation, a gold colored wheel cover with a company logo could be interchanged with a silver colored wheel cover, yet retain the same company logo. The wheel cover 106 utilizes numerous components to securely attach the wheel 102 to the wheel hub 103, including the lubricated joining member 116 that provides free, independent movement between the wheel cover 106 and the wheel 102, a universal adapter 112 that couples varying sizes and dimensions of components of the wheel cover 106 and the wheel hub 103, and a stabilizing member 110 to prevent the wheel cover 106 from rotating with respect to the vehicle 104 as the wheel 102 rotates, so that the indicia 108 remains level and substantially static.

FIG. 1 illustrates a partial perspective view of the vehicle 104 with the wheel enhancing assembly 100 positioned on the front right wheel 102 of the vehicle 104, in accordance with an embodiment of the present invention. In some embodiments, the wheel enhancing assembly 100 includes an interchangeable wheel cover 106 that is centrally positioned on the outer surface of the wheel 102 of the vehicle 104 in a substantially coaxial alignment with a rotational axis of the wheel 102. The wheel cover 106 remains relatively level, stable, and non-rotating while the wheel 102 revolves. A joining member 116, which is preferably lubricated and is shown for example in FIG. 4, couples the wheel 102 to the wheel cover 106, minimizes friction to reduce frictional heat between the wheel hub 103 and the wheel cover 106 and increases fuel efficiency for the vehicle 104. Those skilled in the art will recognize that the wheel enhancing assembly 100 maybe fabricated to couple with a variety of wheel hubs 103 and wheel 102 sizes. The wheel enhancing assembly 100 may also be functional for an eclectic variety of mechanisms that utilize a wheel 102, including, without limitation, motorcycles, bicycles, trucks, airplanes, wall decorations and the like. The wheel cover 106 may include interchangeable indicia 108, such as, but not limited to an artistic design, advertisement, company logo, and the like. Because the wheel cover 106 remains level during rotation, the indicia 108 is substantially level and static, and therefore may be viewed more easily. Both the wheel cover 106, and the indicia 108 that overlays the wheel cover 106 are interchangeable and utilize fasteners such as, but not limited to, magnets, screws, nuts, bolts, and adhesives to attach to the wheel. The details of the constituent parts of the decorative wheel assembly 100 are described in more detail below.

Figure 2A:
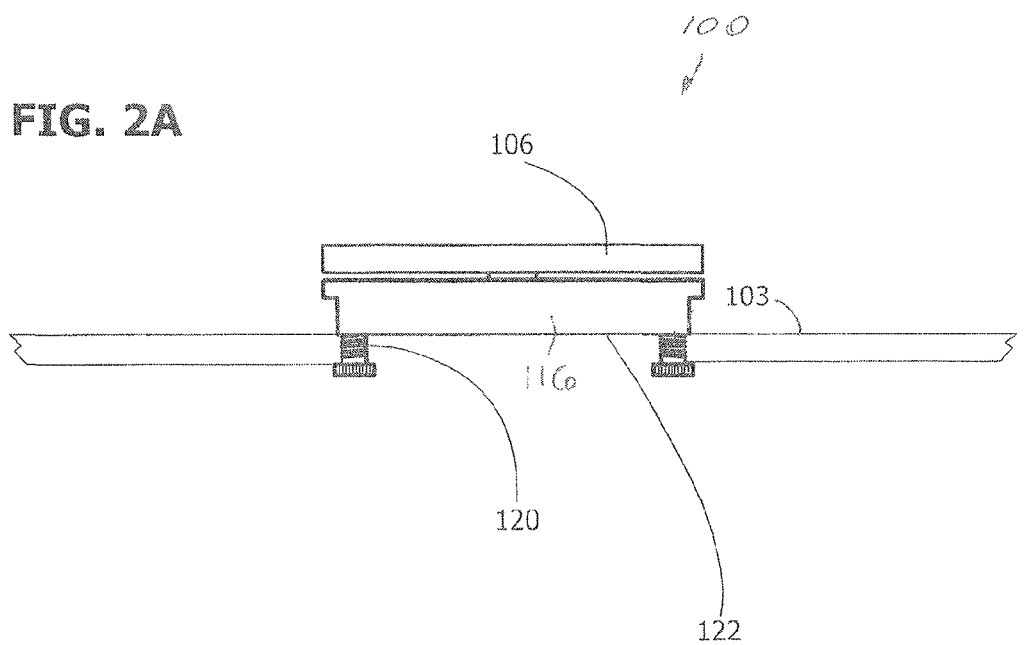
FIGS. 2A and 2B illustrate partial top view of the wheel cover with three support members that extend from an attachment surface of the wheel cover for engaging the wheel hub, in accordance with at least one embodiment of the present invention.
Figure 2B:
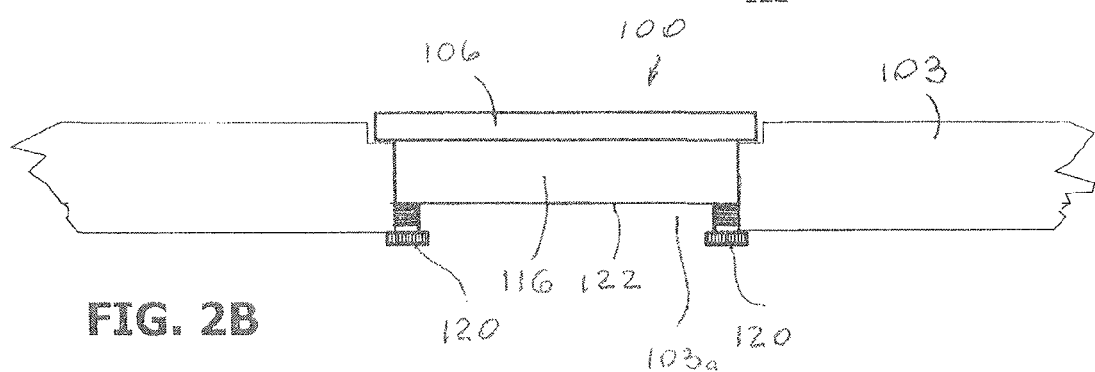

FIGS. 2A-B illustrate a top view of the wheel enhancing assembly 100 with support members 120 that extend from the attachment surface 122 of the wheel enhancing assembly 100 for engaging the wheel hub 103, in accordance with at least one embodiment of the present invention. FIG. 2A illustrates secure attachment of the wheel enhancing assembly 100 to the exterior surface of the wheel hub 103, while FIG. 2B illustrates a presently preferred secure attachment of the wheel enhancing assembly 100 within the aperture 103a of the wheel hub 103. In either embodiment, the support members 120 are threaded fasteners and the heads of the threaded fasteners, or alternatively nut members, are employed for such secure attachment.

Figure 3:
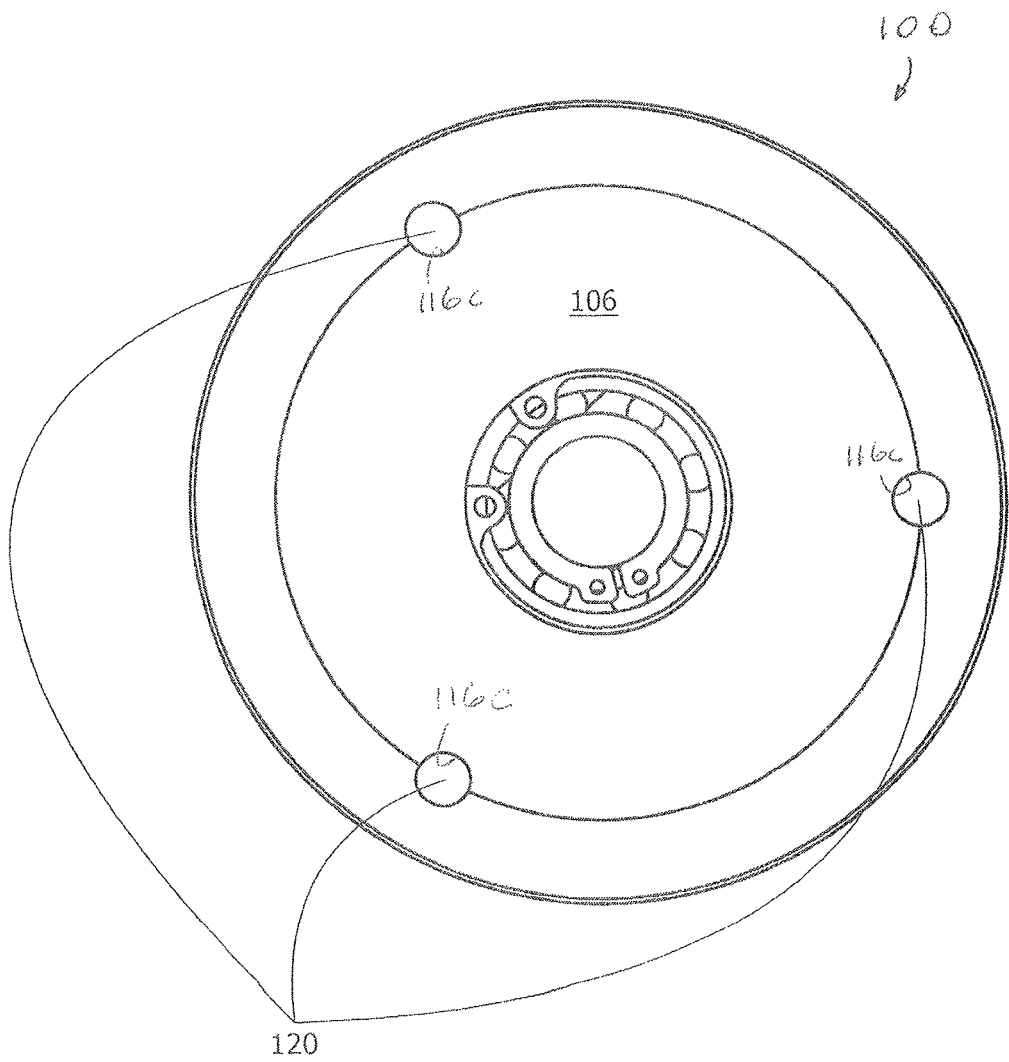
FIG. 3 illustrates a front planar view of the wheel cover of FIG. 2.

FIG. 3 illustrates apertures 116c of the wheel enhancing assembly 100 with the threaded fasteners engaged therewithin with head portion removed for clarity.

FIG. 4 illustrates an exploded view of the wheel enhancing assembly 100, in accordance with at least one embodiment of the present invention. In some embodiments, the wheel enhancing assembly 100 may include, without limitation, a wheel cover 106, an attachment surface 122, a revolving surface 124, a stabilizing member 110, a universal adapter 112, a joining member 116, which is preferably lubricated and carries the attachment surface 122 thereon, and at least one optional bearing member 114 disposed within a bore 115 of the joining member 116. The bore 115 also includes annular flange 115a at one end thereof oppositely facing the cover 106. After assembly, the bore 115 is disposed for rotation on a rotational axis of the wheel 102. In one embodiment, the revolving surface 124 may comprise the exterior, visible portion of the wheel enhancing assembly 100. The revolving surface 124 is substantially inhibited from rotation in relation to the wheel 102, with minimal friction created between the two components. The joining member 116 includes at least one wheel cover aperture 116c for receiving fasteners to secure to the wheel 102. Indicia 108 overlay the wheel cover 106 and may include, without limitation text, graphics, announcements, and company logos. The indicia 108 remain relatively level, stable, and non-rotating while the wheels 102 on the vehicle 104 revolve because of the stabilizing member 110 that functions as an equivalent counterbalancing weight against the wheel cover 106. The stabilizing member 110 substantially inhibits rotation of the wheel cover 106 with respect to a rotating wheel 102 during vehicle 104 movements by serving as an equivalent counterbalancing weight that balances the wheel cover weight. The stabilizing member 110 is constructed and attached to the wheel cover 106 such that gravity causes the stabilizing member 110 to remain below a pivot or axis of rotation of the wheel 102. The stabilizing member 110 may attach to the inner surface of the wheel cover 106, out of visibility from the exterior of the vehicle 104.

In some embodiments, the universal adapter 112 may join variably sized components of the wheel enhancing assembly 100 and the wheel 102. The universal adapter 112 provides an attachment conduit between components having variable sizes, such as the stabilizing member 110 and the lubricated joining member 116. Preferably, the universal adapter 112 is provided as a shaft member or portion having round cross-section in a plane normal to a length thereof and extending from a surface of the stabilizing member 110. The exterior surface of the shaft portion 112 is adapted with a peripheral groove 117 positioned adjacent a free end thereof such that it will be on the external surface of the bearing 114 seated on the peripheral surface of the universal adapter 112. The groove 117 is sized to receive a retaining member, such as a conventional clip, 119 which then retains the bearing 114 on the shaft portion 112 so as to prevent axial movement of the bearing 114. An annular abutment 113 is provided on the peripheral surface of the shaft portion 112 adjacent a surface of the stabilizing member 110 and is configured to space one end of the bearing 114 from the surface of the stabilizing member 110. Another peripheral groove 115b is provided within surface of the bore 115 so as to receive another retaining member, such as clip 123. Clip 123 cages the bearing 114 within the bore 115 against the flange 115a so that the cover 106 is prevented from movement in an axial direction. In other words, the joining member 116, which joins the cover 106 to the wheel 102 and which is preferably lubricated internally to reduce friction, rotates with the wheel 102, while the cover 106 is substantially inhibited from rotation and remains generally level and generally stationary during the rotation of the wheel 102 when viewed from outside thereof. The universal adapter 112 may firmly abut the stabilizing member 110 and position perpendicular to the axis of rotation of the stabilizing member 110 and the joining member 116. In some embodiments, the stabilizing member 110 may secure to the universal adapter 112 through fasteners, such as, without limitation, screws, bolts, magnets, nuts, adhesives, and the like. In yet another embodiment, the shaft portion 112 may be press fit into at least one bearing member 114 in the lubricated joining member 116. Suitable materials for fabricating the universal adapter 112, may include without limitation, steel, metal, titanium, polymer composites, and metal alloys. Joining member 116 defines an annular flange 116a and the cavity 116b in one end of such joining member 116. It is presently preferred for each of the cover 106 and joining member 116 to be proved as a unitary one-piece member.

In yet another embodiment, the joining member 116 attaches the wheel hub 103 to the wheel cover 106 to minimize frictional heat between the wheel cover 106 and the wheel 102, and increase fuel efficiency for the vehicle 104. In one embodiment, the lubricated joining member 116 may allow for free movement in the wheel cover 106 and the revolving surface 124 through the utilization of the bearing members 114, including, without limitation, oil, grease, ball and socket joints, plain bearings, rolling bearings, spherical rotational elements, bushings, and the like. Those skilled in the art, in light of the present teachings, will recognize that a bushing may secure within an aperture in the lubricating joining member 116 to provide a bearing surface for rotary applications. The enhanced lubrication created by the lubricated joining member 116 may also inhibit stress on the wheel 102 from the additional weight of the wheel enhancing assembly 100. A variety of fasteners including, without limitation, magnets, screws, bolts, and nuts may pass through apertures in any of the components of the wheel enhancing assembly 100 for securing to the wheel 102.

Figure 5:
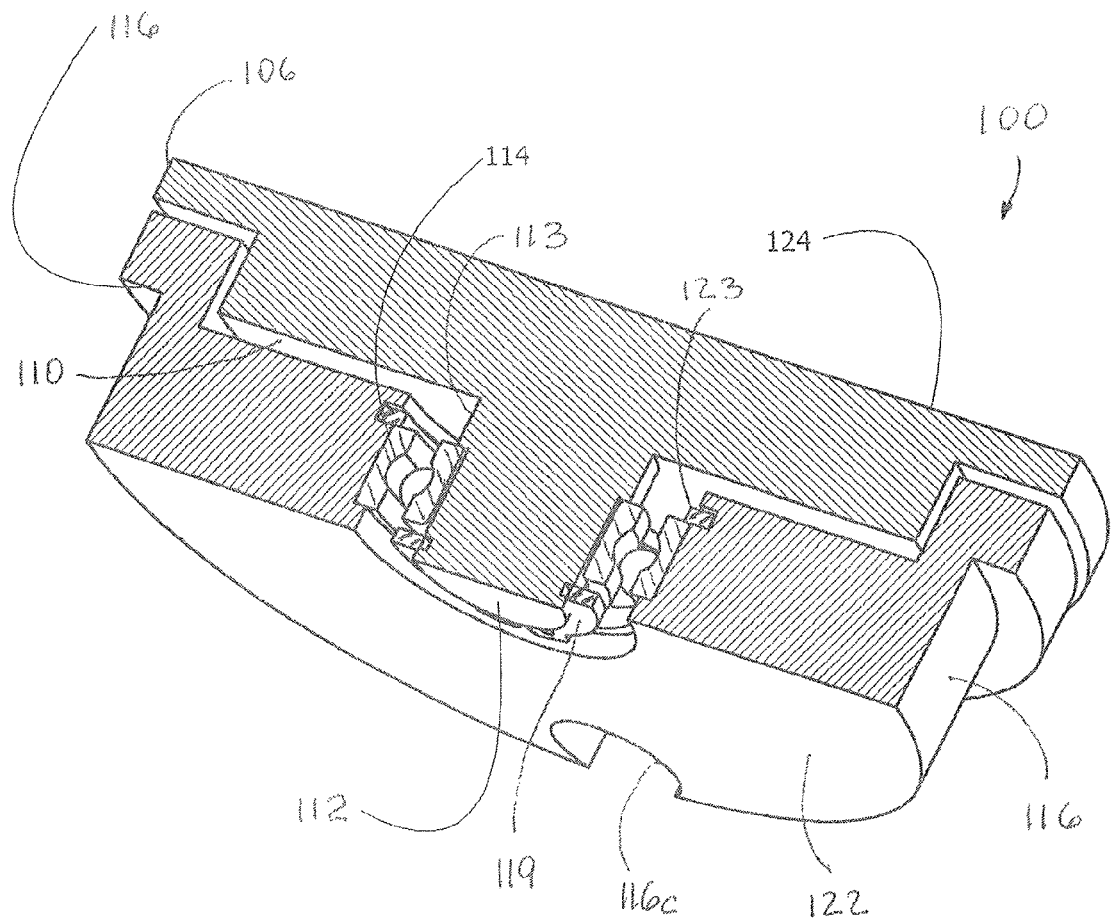
FIG. 5 illustrates a cross-sectional perspective view of the wheel enhancing assembly.

FIG. 5 illustrates a cross-sectional perspective view of the wheel enhancing assembly 106, wherein the components shown in FIG. 4 are in assembled state. For the sake of brevity, the wheel enhancing assembly 100 includes a first or joining member 116 and a second member or cover 106, wherein the joining member 116 is free to rotate about the cover 106 by way of a shaft portion 112 engaging directly either the bore 115 or the bearing 114 mounted within the bore 115 and wherein the joining member 116 attaches the wheel enhancing assembly 106 to the wheel 102.

Figure 6:
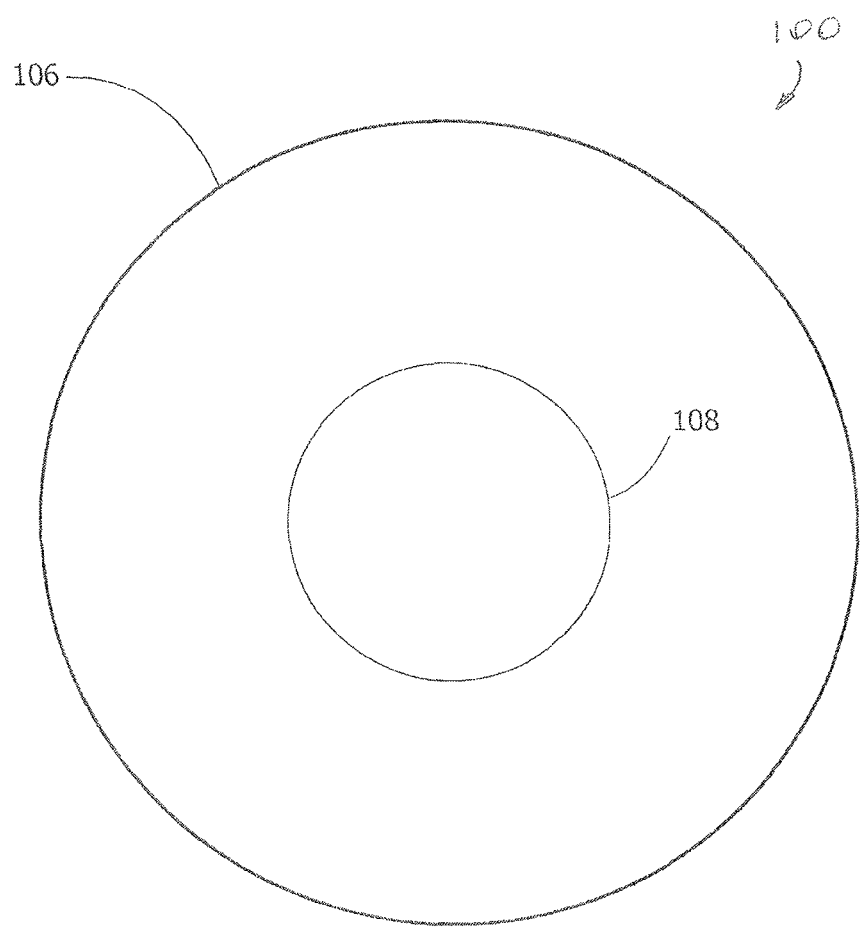
FIG. 6 illustrates a front view of the wheel cover, in accordance with at least one embodiment of the present invention.

FIG. 6 illustrates a planar elevation view of the wheel cover 106, in accordance with at least one embodiment of the present invention.

In yet another embodiment, the wheel cover 106 may comprise an annular shape and be shaped and dimensioned to fit standard sized wheels 102, including, without limitation, 4×100 mm, 5×100 mm, and 5×115 mm. Those skilled in the art, in light of the present teachings, will recognize that the wheel cover 106 may comprise a variety of bolt circle geometries to fit the varying bolt circle diameters for different vehicles 104. At least one wheel cover aperture may be interspaced around the wheel cover 106 to provide space for a fastener, such as a bolt or screw to pass through the apertures in the wheel cover 106 and the wheel 102. Indicia 108 at least partially overlays the wheel cover 106, and may include, without limitation, text, graphics, and company logos. Those skilled in the art will recognize that the indicia 108 may provide a surface for artistic expression, affiliation, membership, community, advertisement or general communications in the form of text and/or graphics or other representation. Examples of artistic expression include, without limitation, photographs of nature and/or people. Examples of advertisements include slogans, logos, brand names, and sketches of goods.

Examples of general communications include political rhetoric and religious speech, depicted textually and/or graphically. Examples of affiliation, membership, and community include school names, logos and mascots; sports teams names, mascots and logos; town names and icons; church names and icons; and many others. The indicia 108 removeably attach to the wheel cover 106 through fasteners, including, but not limited to, magnets, screws, bolts, adhesives, and the like.

In one alternative embodiment, both the wheel cover 106 and the indicia 108 that overlays the wheel cover 106 may be interchangeable and allow for customization of the wheel 102 to achieve a desired look. For example, without limitation, a gold colored wheel cover with a blue company logo could be interchanged with a green colored wheel cover, yet retain the same company logo. Those skilled in the art, in light of the present teachings, will recognize that because the wheel cover 106 is removable and multiple wheel covers 106 may be interchanged to enable the display of numerous permutations of wheel covers 106 and indicia 108.

It is also to be understood that indicia 108 may be provided in different regions of the cover 106 and does not have to be centrally disposed thereon.

Figures 7A, 7B:
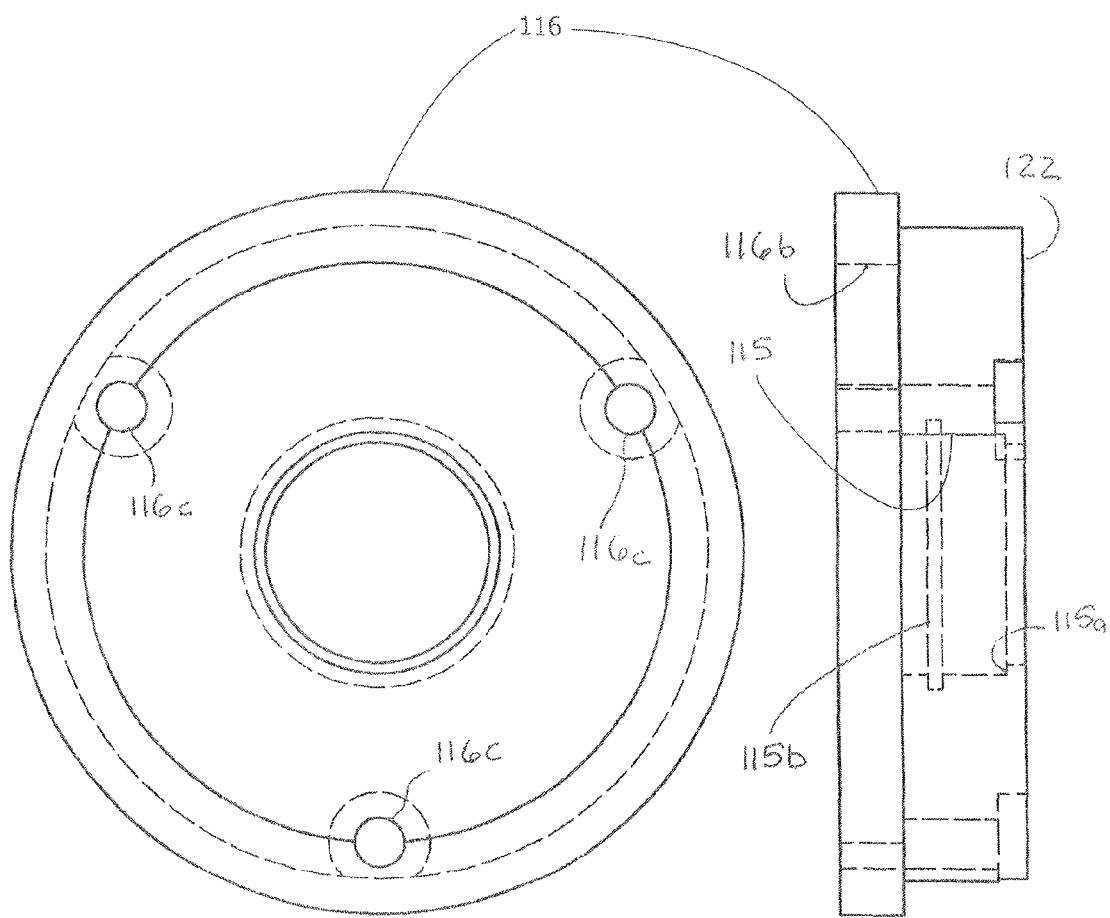
FIGS. 7A and 7B illustrate a frontal view and a side view of the joining member, in accordance with at least one embodiment of the present invention.

The wheel assembly 100 may be manufactured from any relatively strong resilient materials including plastics, metals, resins, and combinations of these. FIGS. 7A and 7B illustrate a frontal view and a side view of the lubricated joining member 116, earlier shown in FIGS. 4 and 5, in accordance with at least one embodiment of the present invention. In some embodiments, the lubricated joining member 116 attaches the wheel 102 to the wheel cover 106, minimizes friction between multiple components in the wheel 102 and the exterior surface 124, inhibits frictional heat, and increases fuel efficiency for the vehicle 104. However, those skilled in the art will recognize that the multiplicity of support members 120 may be the chief component for attaching the wheel cover 106 to the wheel 102. In one embodiment, the lubricated joining member 116 may create free and independent movement for the wheel cover 106 through the utilization of at least one bearing member 114, including, without limitation, oil, grease, ball and socket joints, plain bearings, rolling bearings, spherical rotation elements, bushings, and the like. In some embodiments, a bushing may secure within an aperture in the lubricated joining member 116 to provide a bearing surface for rotary applications. Those skilled in the art, in light of the present teachings, will recognize that the wheel enhancing assembly 100 may contribute additional weight to the wheel 102 and the wheel hub 103, thereby hindering the rotation of the wheel 102. In some embodiments, utilizing the lubricated joining member 116 minimizes frictional forces between the different components in the wheel 102 and the wheel enhancing assembly 100 to facilitate rotation of the wheel 102, thereby negating the effect that the extra weight may have on the rotation of the wheel 102. In some embodiments, the enhanced lubrication created by the lubricated joining member 116 may also inhibit stress on the wheel 102 from the additional weight of the wheel enhancing assembly 100.

Those skilled in the art, in light of the present teachings, will recognize that the bearing member 114 may fit within the bore 115 with the fit being a friction fit or interference fit. An example of an interference fit is where the outer surface of a spherical bearing 114 is forced into the inner diameter of the bore 115, the surface defining the inner diameter of the bore is deformed to a larger dimension while the surface defining the inner diameter of the bore applies a compressive force against the outer surface of the bearing 114, resulting in friction between the spherical bearing 114 and the bore 115. Interference fits may be characterized by a diametric interference of approximately 0.001 to 0.002 units per unit of shaft diameter. Additionally, a friction fit may be characterized by diametric interference of less than approximately 0.001 to 0.002 units per unit of shaft diameter. Because of friction, neither attachment by friction fit nor interference fit requires fasteners.

In yet another embodiment, the lubricated joining member 116 may include at least one extending member 120. Each extending member 120 may extend substantially perpendicular from the lubricated joining member 116 to grip the wheel hub 103. In some embodiments, the lubricated joining member 116 may include three to ten extending members 120. Each extending member 120 may be adapted to form radially inward, towards the center of the lubricated joining member 116 when pressed into the wheel hub 103. In some embodiments, at least one extending member 120 may be adapted to secure the wheel cover 106 to the wheel hub 103 with numerous fasteners, including without limitation, friction, clamps, screws, adhesives, magnets, and the like. In one embodiment, after the wheel cover 106 positions into the wheel hub 103, fasteners such as screws may be tightened, exerting pressure against at least one extending member (not shown), and moving at least one extending member (not shown) outward from the center of the lubricated joining member 116 towards the wheel hub 103. The pressing force may create a snug fit between the lubricated joining member 116 and the wheel hub 103.

In one alternative embodiment, each extending member 120 may have a length that is selected to have as much surface contact with the inner portion of the wheel hub 103 and not interfere with the rotation of the wheel 102. When inserted into the wheel hub 103, at least one extending member 120 may form a press fit, a friction fit, or interference fit with the wheel 102. The type of fit may be selected by the weight of the wheel hub 103, the materials of the lubricated joining member 116 and the wheel 102. In one embodiment, each extending member (not shown) extends approximately ⅛' to ⅝' from the lubricated joining member 116. However, in other embodiments, greater and lesser lengths may be included. In one exemplary embodiment, each extending member (not shown) may be spaced about 2 to 12 inches apart. In various embodiments, various numbers and dimensions may be utilized for the extending members 120. Suitable materials for fabricating the lubricated joining member 116 include, without limitation, metals, composites, plastics, injection molded plastic, machined aluminum, or other strong resilient material that can be shaped accordingly, and/or combinations of these materials.

Figure 8:
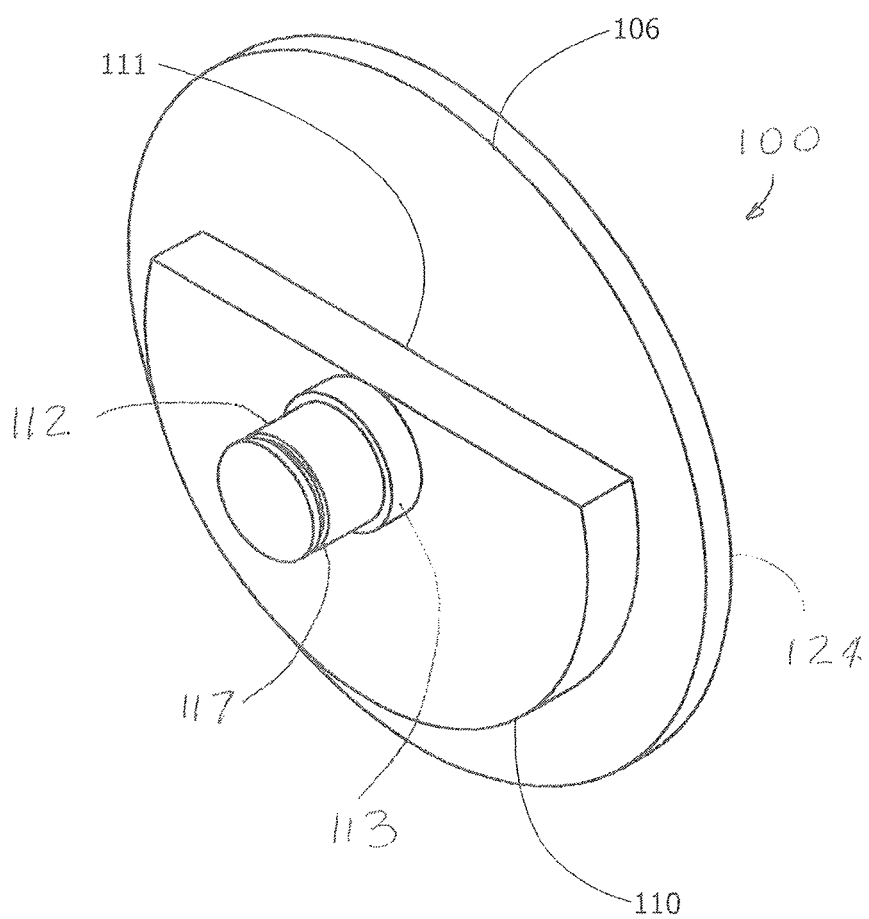
FIG. 8 illustrates the stabilizing member, in accordance with at least one embodiment of the present invention.

FIG. 8 illustrates the cover 106 and the stabilizing member 110, earlier shown in FIGS. 4 and 5, in accordance with at least one embodiment of the present invention. The stabilizing member 110 is configured for gravity to cause the stabilizing member 110 to remain below a pivot or axis of rotation of the wheel 102. The stabilizing member 110 substantially inhibits rotation of the wheel cover 106 with respect to a rotating wheel 102 during vehicle 104 movements by serving as an equivalent counterbalancing weight that balances the wheel cover weight. The stabilizing member 110 preferably is attached to the inner surface of the wheel cover 106, out of visibility from the exterior of the vehicle 104. The stabilizing member 110 may be an independent component, but preferably is integral with one or more of the universal adapter 112 and the wheel cover 106 as a one-piece construction, wherein the stabilizing member 110 is a portion of the cover 106.

The stabilizing member 110 may be dimensioned and shaped in numerous shapes, including, without limitation, "T" shape, umbrella, mushroom, or a rectangular bar. In some embodiments, a wider portion of the stabilizing member 110 retains most of the weight, and rests lower to the ground relative to a narrower, lighter portion of the stabilizing member 110. It is currently preferred for the stabilizing member 110 to be sized so as to fit within the cavity 116b. The orientation of the stabilizing member 110 is weighted so as to keep the wheel cover 106 and the indicia 108 generally level and relatively stationary while the wheel 102 revolves or the vehicle 104 is in motion. Those skilled in the art, in light of the present teachings, will recognize that the stabilizing member 110 may include a center of gravity that is radially asymmetric to an axis through which the stabilizing member 110 mounts to the universal adapter 112. The stabilizing member 110 may comprise of a relatively heavy substance, such as a metal. Typically, the stabilizing member 110 is weighted to remain generally perpendicular to the direction the vehicle 104 is travelling while the vehicle 104 is in motion, and to keep the stabilizing member 110 generally perpendicular to the ground and stationary when the vehicle 104 is stationary. It is to be further understood, that stabilizing member 110 causes pendulum like motion of the cover 106 so that the cover 106 remains generally level and relatively stationary during rotation of the wheel 102.

In one embodiment, the stabilizing member 110 may attach to the universal adapter 112 through at least one aperture sized and dimensioned to receive at least one fastener, including, without limitation, a screw, a bolt, a magnet, and the like. In yet another embodiment, the stabilizing member 110 may include a mounting surface 111 to engage with, and attach to the wheel cover 106. The angle of incline on the mounting surface 111 may be selected such that when the wheel cover 106 engages the mounting surface, the wheel cover 106 may be easily viewed from an adjacent vehicle 104 or the side of the roadway. In one further embodiment, the wheel cover 106 may attach to the stabilizing member 110 with at least one fastener.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose.

Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing a decorative wheel assembly that provides stable and level indicia while the wheel rotates, and inhibits frictional forces according to the present invention will be apparent to those skilled in the art. Various aspects of the invention have been described above by way of illustration, and the specific embodiments disclosed are not intended to limit the invention to the particular forms disclosed. The particular implementation of the decorative wheel assembly that provides level indicia while the vehicle rotates, and inhibits frictional forces may vary depending upon the particular context or application. By way of example, and not limitation, the a decorative wheel assembly that provides a level indicia while the vehicle rotates, and inhibits frictional forces described in the foregoing were principally directed to custom tailored decoration of wheels on a vehicle implementations; however, similar techniques may instead be applied to any object that rotates, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims. Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A cover assembly for a rotatable wheel, said cover assembly comprising:
   (a) a disk-shaped first member configured for attachment to a hub of the rotatable wheel for rotation therewith and comprising a cavity and a bore;
   (b) a bearing sized to fit within said bore;
   (c) a second member comprising a weighted portion thereof disposed within said cavity and configured to substantially inhibit rotation of said second member during rotation of said disk-shaped first member, said second member further comprising a shaft portion having a peripheral surface thereof sized to fit an aperture of said bearing;
   (d) a retaining ring engaging a groove in said shaft portion, adjacent a free end thereof, so that said second member is mounted on said disk-shaped first member; and
   (e) a peripheral groove provided in a surface of said bore, said peripheral groove being disposed so as to cage said bearing between a flange of said bore and a retaining member received within said peripheral groove.

2. The cover assembly of claim 1, wherein said shaft portion extends from said weighted portion.

3. The cover assembly of claim 1, further including indicia disposed on an exterior surface of said second member, said indicia remaining generally stationary during rotation of the wheel.

4. The cover assembly of claim 3, wherein said indicia is interchangeable.

5. The cover assembly of claim 1, wherein said weighted portion is disposed on an inner surface of said second member and having a mass thereof disposed generally below a rotational axis of the rotatable wheel when said cover assembly is attached thereto.

6. The cover assembly of claim 1, wherein first member further includes support members configured to fasten said cover assembly to the hub of the rotatable wheel.

7. The cover assembly of claim 6, wherein said first member includes three apertures formed though a thickness thereof and wherein the support members comprise three threaded fasteners, each operatively received within a respective aperture, said fasteners extend perpendicularly from a surface of said first member and press against an inner surface of the wheel hub, whereby resulting pressure and grip provides a secure attachment between said cover assembly and the rotatable wheel.

8. The cover assembly of claim 1, further including a rim of the rotatable wheel.

9. The cover assembly of claim 1, further including the rotatable wheel.

10. The cover assembly of claim 9, further including a vehicle having the rotatable wheel mounted for rotation thereon.

11. A cover assembly for a rotatable wheel, said cover assembly comprising:
   (a) a unitary one-piece first member including:
      i. a bore formed through a thickness of said first member and aligned with a rotational axis of the rotatable wheel,
      ii. a first annular flange disposed within said bore at one end thereof,
      iii. a first peripheral groove formed in a surface of said bore at an axially opposite end thereof,
      iv. a second annular flange disposed on said axially opposite end and forming a cavity therewithin, and
      v. apertures formed through a thickness of said first member;
   (b) a bearing sized to fit said peripheral surface of said bore;
   (c) a first retaining member sized to fit said first peripheral groove and configured to cage said bearing within said bore against a surface of said first annular flange;
   (d) a unitary one-piece second member including:
      i. a first portion having a pair of generally planar surfaces spaced apart from each other to define a thickness of said first portion, an inner surface of said first portion positioned adjacent a surface of said second annular flange,
      ii. a weighted second portion disposed on said inner surface of said first portion and having a mass thereof disposed generally below the rotational axis of the rotating wheel having said cover assembly installed thereon, said weighted second portion sized to be received within said cavity,
      iii. a shaft portion extending from a surface of said weighted second portion and having a peripheral surface sized to fit aperture of said bearing,
      iv. an annular abutment on one end of said shaft portion adjacent said surface of said weighted portion, and
      v. a second peripheral groove formed in said peripheral surface of said shaft portion adjacent a free end thereof;
   (e) a second retaining member sized to fit said second peripheral groove and configured to cage said bearing on said shaft portion against said annular abutment;
   (f) threaded members extending from said apertures of said first member generally perpendicular to an inner surface thereof; and
   (g) whereby said second member is substantially inhibited from rotation during rotation of said first member when said cover assembly is installed on the rotatable wheel.

12. The cover assembly of claim 11, further comprising indicia disposed on an exterior surface of said second member, said indicia remaining generally stationary during rotation of the wheel.

13. The cover assembly of claim 11, wherein a surface of said unitary one-piece first member engages an exterior surface of a hub of the rotatable wheel during use of said cover assembly.

14. The cover assembly of claim 11, wherein said unitary one-piece first member is configured to fit within an aperture of a hub of the rotatable wheel.

15. The cover assembly of claim 11, further comprising the rotatable wheel.

16. The cover assembly of claim 15, further including a vehicle having the rotatable wheel mounted for rotation thereon.

* * * * *